US011929849B1

(12) United States Patent
Mahadevan et al.

(10) Patent No.: US 11,929,849 B1
(45) Date of Patent: Mar. 12, 2024

(54) SYMMETRIC ROUTING IN SOFTWARE-DEFINED NETWORKS

(71) Applicant: Cisco Technology, Inc., San Jose, CA (US)

(72) Inventors: Satish Mahadevan, San Ramon, CA (US); Laxmikantha Reddy Ponnuru, San Ramon, CA (US); Samir Thoria, Saratoga, CA (US); Alfred Clarence Lindem, III, Cary, NC (US); Arul Murugan Manickam, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/127,507

(22) Filed: Mar. 28, 2023

(51) Int. Cl.
*H04L 12/46* (2006.01)
*H04L 45/18* (2022.01)

(52) U.S. Cl.
CPC ............ *H04L 12/462* (2013.01); *H04L 45/18* (2013.01)

(58) Field of Classification Search
CPC .............................. H04L 12/462; H04L 45/18
See application file for complete search history.

(56) References Cited

U.S. PATENT DOCUMENTS

| | | | | |
|---|---|---|---|---|
| 9,929,949 | B2 * | 3/2018 | Mahadevan | ............ H04L 45/02 |
| 10,122,627 | B2 * | 11/2018 | Murgia | ................... H04L 45/64 |
| 2013/0205040 | A1 | 8/2013 | Naor et al. | |
| 2015/0036508 | A1 * | 2/2015 | Fedyk | ................... H04L 45/124 |
| | | | | 370/238 |
| 2016/0261486 | A1 | 9/2016 | Fang et al. | |
| 2021/0306261 | A1 | 9/2021 | Duan et al. | |
| 2022/0109620 | A1 | 4/2022 | Sarcar et al. | |
| 2022/0182313 | A1 | 6/2022 | Manickam et al. | |

OTHER PUBLICATIONS

Sethom et al., "Adaptive Architecture for Internet Access in Mobile Networks", IEEE Vehicular Technology Conference, Sep. 25, 2006.*
Singh et al., "Gateway Selection Scheme for MANET to Internet Connectivity: A Survey", 2020 8th International Conference on Relliability, Infocom Technologies and Optimization, Jun. 4, 2020.*
Cisco SD-WAN Mulit-Region Fabric (Also Hierarchical SD-WAN) Configuration Guide Cisco, Cisco Systems, Inc. Apr. 22, 2022.

* cited by examiner

*Primary Examiner* — Todd L Barker
(74) *Attorney, Agent, or Firm* — Lee & Hayes P.C.

(57) ABSTRACT

Techniques for ensuring symmetric forwarding between disparate networks. The techniques may include receiving a gateway preference order associated with a route advertised by an edge node, the edge node associated with a first network. The techniques may also include determining, based at least in part on the gateway preference order, that a gateway node is a more preferred gateway for the route than another gateway node, the gateway node configured to facilitate communications between the first network and a second network. In some examples, the techniques may also include converting the gateway preference order into a metric associated with an IP routing protocol that is in use in the second network. In some examples, the route including the metric may be distributed within the second network such that the gateway node is the more preferred gateway for return traffic of the route.

20 Claims, 9 Drawing Sheets

SYMMETRIC ROUTING IN SOFTWARE-DEFINED NETWORKS

TECHNICAL FIELD

The present disclosure relates generally to, among other things, techniques for ensuring symmetric forwarding between disparate networks, without requiring data plane changes.

BACKGROUND

In software-defined networks (SDNs), on-device stateful features such as Network Based Application Recognition, Security, Application Quality of Experience, and Network Address Translation require symmetric forwarding. Additionally, externally hosted services like firewalls and intrusion prevention/detection systems in the cloud, in private datacenters, or in point of presence locations can also require symmetric forwarding. As such, symmetric forwarding solutions need to work in a wide variety of SDN scenarios/topologies including, but not limited to: hub-and-spoke, with multiple hub routers; Multi-Region Fabric (MRF) with multiple border routers; and dual homed branch.

However, the solutions that are currently utilized for symmetric forwarding have some disadvantages. For instance, these solutions require the use of complex and error-prone control policies to set up hop-by-hop forwarding for traffic in both directions to ensure symmetric forwarding. Additionally, for service-side routing, complex route-maps are necessary to set up path symmetry for traffic in both directions. These policies and route-maps are extremely complex to manage over time.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
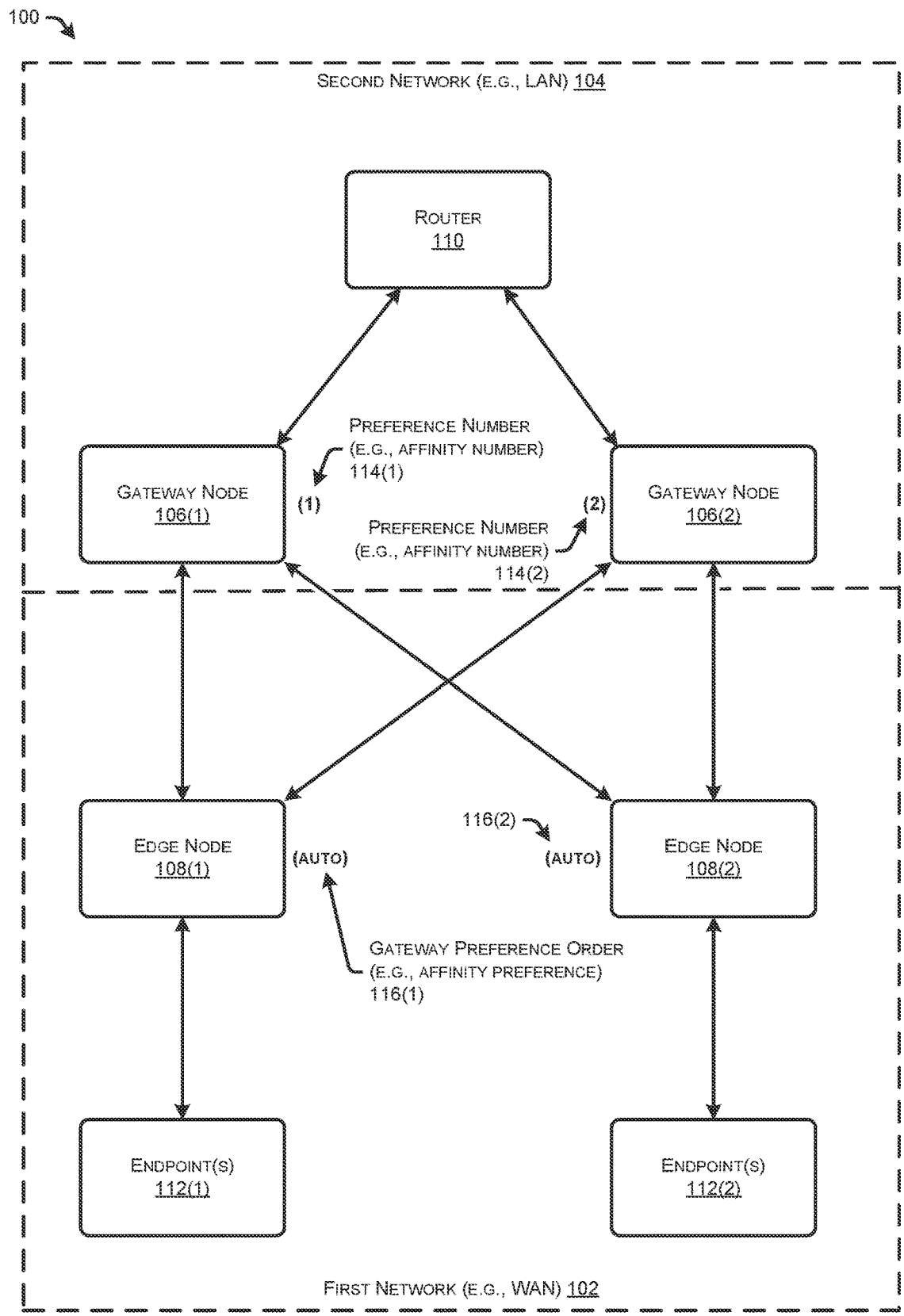
FIG. 1 is an illustration associated with performing the symmetric forwarding techniques disclosed herein in an example active/standby gateway architecture.

This disclosure describes techniques associated with utilizing control plane constructs to ensure symmetric forwarding between disparate networks, without requiring data plane changes. By way of example, and not limitation, the techniques disclosed herein may include receiving, at a gateway node that facilitates communications between a first network and a second network, a gateway preference order associated with a route advertised by an edge node. In some examples, the edge node may be disposed in, or otherwise associated with, the first network. The techniques may also include determining, by the gateway node and based at least in part on the gateway preference order, that the gateway node is a more preferred gateway for the route than another gateway node. In some examples, the gateway node may covert the gateway preference order into a metric associated with an internet protocol (IP) routing protocol that is in use in the second network. Additionally, in some examples, the gateway node may distribute the route including the metric to the second network such that the gateway node is the more preferred gateway for return traffic of the route.

The techniques described herein may be performed as a method and/or by a system having non-transitory computer-readable media storing computer-executable instructions that, when executed by one or more processors, cause the system to perform the techniques described above and herein.

Example Embodiments

This application describes techniques for utilizing various control plane constructs to ensure symmetric forwarding in both the wide area network (WAN) and local area network (LAN) sides of a network, without requiring data plane changes. In some examples, the control plane constructs utilized to achieve symmetric forwarding may include derived router affinity for handling a multi-hop software-defined wide area network (SD-WAN). Additionally, in some examples, a protocol independent cost metric may be used for achieving symmetric routing on the LAN side, and sub-regions may also be utilized for achieving horizontal scalability of gateways. For example, using the techniques disclosed herein, gateways (or border routers) may translate from one information set to another information set (e.g., translate from router affinity metrics to standardized internet routing protocol (IP) metrics) to determine symmetric routes for communicating data between disparate networks (e.g., from a LAN to WAN, and vice-versa).

In one aspect of this disclosure, the techniques may be utilized to compute protocol independent cost from affinity to provide symmetric forwarding for a multi-homed data center (DC)/Hub (active/standby). The concept of "derived-routing-cost-from-affinity" may be used when routes are re-originated or redistributed by border routers or transport gateways. To illustrate, consider an example network that uses router affinity. In the example network, a first gateway "GW1" is configured with affinity value "1" and a second gateway "GW2" is configured with affinity value "2." GW1 and GW2 are located on the LAN side of the example network. Additionally, a first edge router "E1" and a second edge router "E2" located on the WAN side of the example network are configured with an affinity preference order of "auto," meaning that the edge routers will prefer GW1 and fallback to GW2 if GW1 is not reachable (e.g., lower affinity value is automatically preferred over higher affinity value). Further, in the example network, a first prefix "P1" is behind E1. In such a scenario, when GW1 receives the route P1 (from E1), it sees that E1 has affinity preference order of "auto," so GW1 sets its own affinity-number configuration (1 in this case) as the protocol independent cost in the Routing Information Base (RIB) of the LAN. Similarly, when GW2 receives P1, it sets its own affinity-number configuration (2 in this case) as the protocol independent cost in the RIB. When GW1 and GW2 redistribute this route from the RIB into other protocols, such as Border Gateway Protocol (BGP), Open Shortest Path First (OSPF), etc., this protocol independent cost may be automatically translated into the corresponding cost attribute of the destination protocol. For example, in the case of External BGP (EBGP), the protocol independent cost may be translated to "med". In the case of Internal BGP (IBGP), the protocol independent cost may be translated to "local_pref". In the case of OSPF, the protocol independent cost may be translated to "ospf-cost". In this way, for P1 (from E1), GW1 will attach a better cost/metric, so all the LAN side routers will prefer GW1 over GW2 to reach P1 (through E1).

In another aspect of this disclosure, the techniques may be utilized to compute derived-affinity from affinity. That is, when routes are re-originated by a gateway or a border router, the concept of derived-affinity may be used to ensure that return traffic will flow via the same gateway as the forward traffic. For example, to restart the example from above, Overlay Management Protocol (OMP) on GW1 and GW2, and/or any border routers, may learn routes from branches E1 and E2. When GW1 receives the route P1 (from E1), it sees that E1 has the affinity preference order of "auto," so GW1 sets its own affinity-number configuration (1 in this case) as the derived-affinity (lower value is better) in the re-originated route. Similarly, GW2 may set its own affinity-number configuration (2 in this case) as the derived-affinity. This ensures that GW1 will be used for all branch-to-branch traffic in the hub-and-spoke case (due to better derived-affinity) and GW2 will be used as standby. And since GW1 re-originates the route with a better derived-affinity value (compared to the one from GW2), it attracts all the return traffic to P1 (E1) towards itself. The same concept may be used on the border routers as well, when routes are re-originated into a core region from an access region.

The above two examples describe active/standby gateway behavior, since GW1 will always be preferred over GW2 and GW2 will be a standby gateway as a result. However, the techniques of this disclosure can also be applied in scenarios in which active/active gateway behavior is preferred by using per-branch affinity preference orders. This can be used in scenarios where the site-to-site traffic flows via direct tunnels (e.g., as is often the case within an Multi-Region Fabric (MRF) region). For example, when a gateway (or border router) learns a route from an edge node that has a custom (e.g., not "auto") affinity preference order configured, the derived-affinity may be computed a little differently than in the above two examples. For example, take the case in which GW1 has affinity-number 1, GW2 has affinity-number 2, E2 has affinity preference order configured as (2, 1) (so that it is configured to prefer GW2 over GW1), and E2 originates a prefix "P2." If the route P2 is received by GW1, GW1 knows that the source (E2) has an affinity preference order of (2, 1) and that GW1's own affinity-number is 1, so GW1 may infer that it is the second-most preferred gateway (e.g., based on the 1-based-index of its own affinity-number in the source's affinity preference order). The 1-based-index is defined as the index (starting with 1) of the affinity matching the route affinity in the ordered list of affinities for the gateway. When GW1 re-originates P2, instead of setting its own affinity-number as the derived-affinity, it sets the 1-based-index of its own affinity-number in the affinity-preference-order of the route originator (E2 in this case), so the derived-affinity in this case will be 2. When GW2 does its re-origination for P2, it sets the derived-affinity as 1, since its affinity-number 2 is present in the very first spot in the route originators affinity preference order, it sets the derived-affinity to 1 in the re-originated route. This way, GW2 is the preferred gateway for return traffic as well, thereby achieving traffic symmetry.

Another way of achieving active/active gateway behavior according to the techniques disclosed herein is by using virtual private network (VPN) carving, where different gateways may act as primary for different VPNs (or even different application types that can be identified using prefix lists or prefix tagging). For example, assume that GW1 has affinity-number 1 for VPN1 and affinity-number 2 for VPN2; GW2 has affinity-number 1 for VPN2 and affinity-number 2 for VPN1 (e.g., reverse of what GW1 has). In this case, when E1 and E2 send traffic in VPN1, they prefer GW1 and GW2 is backup. And for VPN2 traffic, GW2 is primary and GW1 is backup. This way, both gateways are acting as active at the same time.

In the solutions described above, horizontal scaling of gateways may be a problem since there is only a gateway hop in between (e.g., for traffic between edge routers). To achieve better horizontal scalability, all branch-to-branch traffic may be configured to traverse two gateways by dividing a region into sub-regions and assigning different gateways for each sub-region. In this model, traffic that is flowing from one sub-region to another sub-region will hit the gateway for both sub-regions. Take for example a network that has a first sub-region and a second sub-region. The first sub-region has a first gateway "GW1" and the second sub-region has a second gateway "GW2." Additionally, a first edge node "E1" is disposed in the first sub-region and a second edge node "E2" is disposed in the second sub-region. In such an example network, traffic from E1 to E2 will follow the path E1→GW1→GW2→E2, and the return traffic will take the same path, but in reverse. Within a sub-region, there can be multiple gateways deployed for redundancy. And all the mechanisms described in previous scenarios above (e.g., per-branch-affinity, VPN carving, etc.) can be used to achieve active/active within a sub-region. This mechanism provides a great deal of horizontal scalability, by allowing a lot of gateways to be in active mode at the same time without any need for per-branch-affinity-preference-order or VPN carving.

As noted above, the techniques of this disclosure also are applicable to MRF networks. In examples, achieving symmetry in MRF networks may be similar to the different scenarios described above. In the case of MRF networks, however, border routers may take on some or all of the functionality of the gateways as described above. In examples, derived-affinity may be used when routes are re-originated from access-region to core-region. Additionally, or alternatively, derived-protocol-independent-cost may be used when routes are redistributed into data centers that could be behind the border routers. All the active/active solutions described above (per-branch-affinity-preference, VPN carving, sub-regions, etc.) may be used to achieve active/active load balancing on the border routers.

In some examples, conditions that may be necessary to achieve symmetric routing in MRF networks according to the various implementations described herein may include, but not be limited to: (i) refraining from sending affinity attribute(s) into the MRF core region (e.g., "derived-affinity" may be meant for use in the core region); (ii) when a border router originates its LAN-side prefixes into the MRF core region, it should set derived-affinity, it should not set the affinity attribute in that case, and the value of the derived-affinity will be the same as the affinity number configured locally on that border router (this may help with symmetric routing when multiple border routers originate the same LAN-side prefix into the core region, and without setting the derived-affinity properly, the core region traffic might hit either of the border routers, thereby causing asymmetry for some of the traffic in the return direction); (iii) the above may also apply to service routes that are sent into the MRF core region—they may be sent with the derived-affinity attribute instead of the affinity attribute; (iv) when a border router adds MRF core-region routes to the RIB, it may install the routes with the locally configured affinity number as the RIB-metric, otherwise the return traffic from the LAN side might hit a different border router from the one that was used for the forward traffic, thereby resulting in asymmetry (this may be necessary for MRF core-region routes (not for MRF access-region routes) because access region routes may be received with the affinity-preference-order attribute and that can be used to compute the derived-affinity and protocol-independent-cost metric); (v) in the case of transport-gateway-re-originated paths, always sent them from transport-gateway to control plane with both affinity and derived-affinity, and the control plane may need to have the following logic: (a) for transport-gateway-re-originated paths, if the destination peer is not a transport-gateway, keep only the affinity attribute and reset the derived-affinity attribute; and (b) for transport-gateway-re-originated paths, if the destination peer is a transport-gateway, keep only the derived-affinity attribute and reset the affinity attribute.

According to the technologies disclosed herein, end-to-end symmetric routing may be achieved across both the WAN and the LAN sides in a simple and intent-based fashion. The disclosed technologies eliminate any need for low-level manual controls by a user, and also provide a high level of horizontal scalability of gateways. These and other improvements in computer and networking-related technologies will be readily apparent to those having ordinary skill in the art.

By way of example, and not limitation, a method according to the technologies disclosed herein may include receiving, at a gateway node, a gateway preference order (e.g., affinity preference configuration) associated with a route advertised by an edge node. In examples, the gateway node may be configured to facilitate communications between a first network and a second network, and the edge node may be associated with the first network. In some examples, the gateway preference order may be received from the edge node as part of the edge node advertising the route to the gateway node. For instance, the gateway preference order may be included as metadata or a tag within the route advertisement, or the like. In some examples, advertising the route by the edge node may include advertising one or more address prefixes (e.g., IPv4 or IPv6 prefixes) associated with a group of devices that the edge node serves or otherwise communicate packets through the edge node.

In some examples, the first network may be a wide area network (WAN), such as a software-defined wide area network (SD-WAN), and the second network may be a local area network (LAN), such as a LAN within a data center. In such examples, the datacenter may provide connectivity between multiple different WANs. That is, the second network may facilitate communications between the first network and a third network, in some instances.

In some examples, both of the first network and the second network may be WANs, and the gateway node may be a border router or a collection of border routers. For instance, the first network and the second network may be different regions of a Multi-Regional Fabric (MRF) network, such as a core region and an access region. For instance, the first network may be an access region network and the second network may be a core region network.

In some examples, the method may include determining, by the gateway node and based at least in part on the gateway preference order, that the gateway node is a more preferred gateway for the route than another gateway node. That is, the gateway node may determine that it ranks higher than the other gateway node in the edge node's gateway preference order. For example, according to the techniques described herein, each gateway node may be provisioned with, or otherwise assigned, a respective preference number (e.g., affinity number, affinity group number, etc.). As such, the gateway preference order may include a ranked list of the preference numbers. As such, when the gateway node receives the gateway preference order for the route/edge node, the gateway node may determine its ranking by looking up where its preference number is listed/ranked with respect to other preference numbers included in the gateway preference order. For example, if the preference number of the gateway is "1" and the gateway preference order received from the edge node is "3, 1, 2," then the gateway node may determine that it ranks lower than gateway "3" and higher than gateway "2." As another example, if the gateway preference order received from the edge node specifies an "auto" or default preference order, then the gateway node may determine that it ranks highest among gateways since its preference number is 1 (assuming that the network is configured so that lowest preference number is preferred in the default case).

In some examples, the edge node may advertise the route to all of the gateway node(s) that facilitate communications between the first network and the second network, and the other gateway node(s) may determine, based on the gateway preference order and, in some instances, their own preference number and their respective rankings with respect to the other gateways. This process for the other gateway nodes to determine their ranking may be similar to, or the same as, what was described in the preceding paragraph, or as described herein.

In some examples, the method may include converting, by the gateway node, the gateway preference order (and/or its rank among gateways, in general) into a metric associated with a communication protocol (e.g., IP routing protocol) that is in use in the second network. That is, the gateway node may convert the gateway preference order (e.g., affinity preference) or its rank into a standardized IP metric. For example, the gateway node, may convert the gateway preference order into a protocol independent cost metric and store the protocol independent cost metric in a routing information base (RIB). Additionally, or alternatively, the gateway node may convert the gateway preference order into a derived-affinity metric associated with the second network.

In some examples, the gateway node may redistribute or re-originate the route in the second network and include a metric, cost, derived-affinity, or other indication that causes the devices of the second network to prefer the gateway node more than the other gateways for return traffic associated with the route. For example, in the case of redistributing the route with cost-based metrics, then the gateway node may use different metrics based on what communication protocol is in use. For instance, if the communication protocol is External Border Gateway Protocol (EBGP), then the cost attribute/metric for the route may be "med"; if the communication protocol is Internal Border Gateway Protocol (IBGP), then the cost attribute/metric for the route may be "local_pref"; or if the communication protocol is Open Shortest Path First (OSPF), then the cost attribute/metric may be "ospf-cost."

In examples, the techniques disclosed herein may also be useful in cases such cloud-native applications and services, since the same symmetric forwarding problems exist in the cloud-native domain as well (e.g., especially in service insertion scenarios). For example, when there are multiple paths via multiple cloud gateways, the techniques disclosed herein provide symmetric forwarding across the WAN and LAN parts of the network. For instance, the techniques may be used to achieve symmetric routing in scenarios with Azure vHubs and AWS TGWs/CGWs. Furthermore, when the SDCI/CSP backbone is used in MRF deployments, it provides symmetric forwarding across the multiple levels of cloud gateways that are involved in setting up a 3-tunnel MRF forwarding path.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is an illustration associated with performing the symmetric forwarding techniques disclosed herein in an example active/standby gateway architecture 100. The architecture includes a first network 102, a second network 104, a first gateway node 106(1), a second gateway node 106(2) (referred to collectively as "gateway nodes 106"), a first edge node 108(1), a second edge node 108(2) (referred to collectively as "edge nodes 108"), a router 110, first endpoint(s) 112(1), and second endpoint(s) 112(2) (referred to collectively as "endpoint(s) 112").

In some examples, the first network 102 and the second network 104 may be disparate networks. For instance, the first network 102 may be a wide area network (WAN) and the second network 104 may be a local area network (LAN) (e.g., a LAN within a data center). In some examples, the second network 104 and/or the first network 102 may be part of a software-defined wide area network (SD-WAN).

The gateway nodes 106 may facilitate communications between the second network 104 and the first network 102. In some examples, the gateway nodes 106 may each have a respective preference number 114 assigned to it. For instance, the first gateway node 106(1) has an assigned preference number 114(1) of "1" and the second gateway node 106(2) has an assigned preference number 114(2) of "2." In some examples, a preference number may be a router affinity number, an affinity group number of a router, or the like. In some examples, the gateway nodes 106 may be SD-WAN transport gateways.

In some examples, the edge nodes 108 may each have a respective gateway preference order 116. For instance, the first edge node 108(1) may have a gateway preference order 116(1) of "auto" and the second edge node 108(2) may have a gateway preference order 116(2) of "auto." In some examples, a gateway preference order may be an affinity preference configuration of the edge node indicating which gateway node to prefer.

In examples, the gateway nodes 106 may utilize aspects of the techniques described herein to determine or compute protocol-independent cost metrics from gateway preference orders (e.g., affinity). In some examples, determining protocol independent cost metrics from gateway preference orders may be used when routes are re-originated or redistributed by the gateway nodes 106.

For example, the first gateway node 106(1) is configured with the preference number 114(1) of "1," the second gateway node 106(2) is configured with the preference number 114(2) of "2," and the edge routers 108 are each configured with gateway preference orders of "auto," meaning that the edge routers 108 will prefer the first gateway node 106(1) and fallback to the second gateway node 106(2) if the first gateway node 106(1) is not reachable (e.g., lower preference value is automatically preferred over higher preference value). Additionally, the endpoint(s) 112(1) are associated with a prefix "P1" that is behind the first edge node 108(1). In such an example, when the first gateway node 106(1) receives the route associated with the prefix P1 from the first edge node 108(1), the gateway node 106(1) can see that the first edge node 108(1) has the gateway preference order 116(1) of "auto," so the first gateway node 106(1) may set its own preference number 114(1) (1 in this case) as the protocol independent cost metric in a routing information base (RIB). Similarly, when the second gateway node 106(2) receives the route associated with the prefix P1, it may set its own preference number 114(2) (2 in this case) as the protocol-independent cost metric in the RIB.

In this way, when the first gateway node 106(1) and the second gateway node 106(2) redistribute this route associated with the prefix P1 from the RIB into other protocols like BGP, OSPF, etc., the protocol-independent cost metric may be automatically translated into the corresponding cost attribute of the destination protocol. For example, the protocol independent cost could get translated to "med" in the case of eBGP, "local_pref" in the case of iBGP, and "ospf-cost" in the case of OSPF. This way, for traffic of the route associated with the prefix P1 (from the first edge node 108(1)), the first gateway node 106(1) will attach a better cost/metric, so that the router 110 of the second network 104 (e.g., the LAN-side router) will prefer the first gateway node 106(1) to reach P1 over the second gateway node 106(2).

In examples, the gateway nodes 106 may utilize aspects of the techniques described herein to determine or compute derived-affinity from affinity. For example, when routes are re-originated by the gateway nodes 106, the concept of derived-affinity may be used to ensure that the return traffic will flow via the same gateway as the forward traffic. For example, a control plane or overlay management protocol (OMP) on the first gateway node 106(1) and second gateway node 106(2) may learn routes from the different branches associated with the edge nodes 108. when the first gateway node 106(1) receives the route associated with the prefix P1 (from the first edge node 108(1)), it can see that the first edge node 108(1) has the gateway preference order 116(1) (e.g., affinity-preference-order) of "auto," so it may set its own preference number 114(1) (e.g., affinity-number configuration) (1 in this case) as the derived-affinity in the re-originated route. Similarly, the second gateway node 106(2) may set its own preference number 114(2) (e.g., affinity-number configuration) (2 in this case) as the derived-affinity. This ensures that the first gateway node 106(1) will be used for all branch-to-branch traffic in the hub-and-spoke case (due to better derived-affinity) and the second gateway node 106(2) will be used as standby. Additionally, since the first gateway node 106(1) re-originates the route with a better derived-affinity value (compared to the one from the second gateway node 106(2)), the first gateway node 106(1) attracts all the return traffic associated with the route to P1 towards itself.

Figure 2:
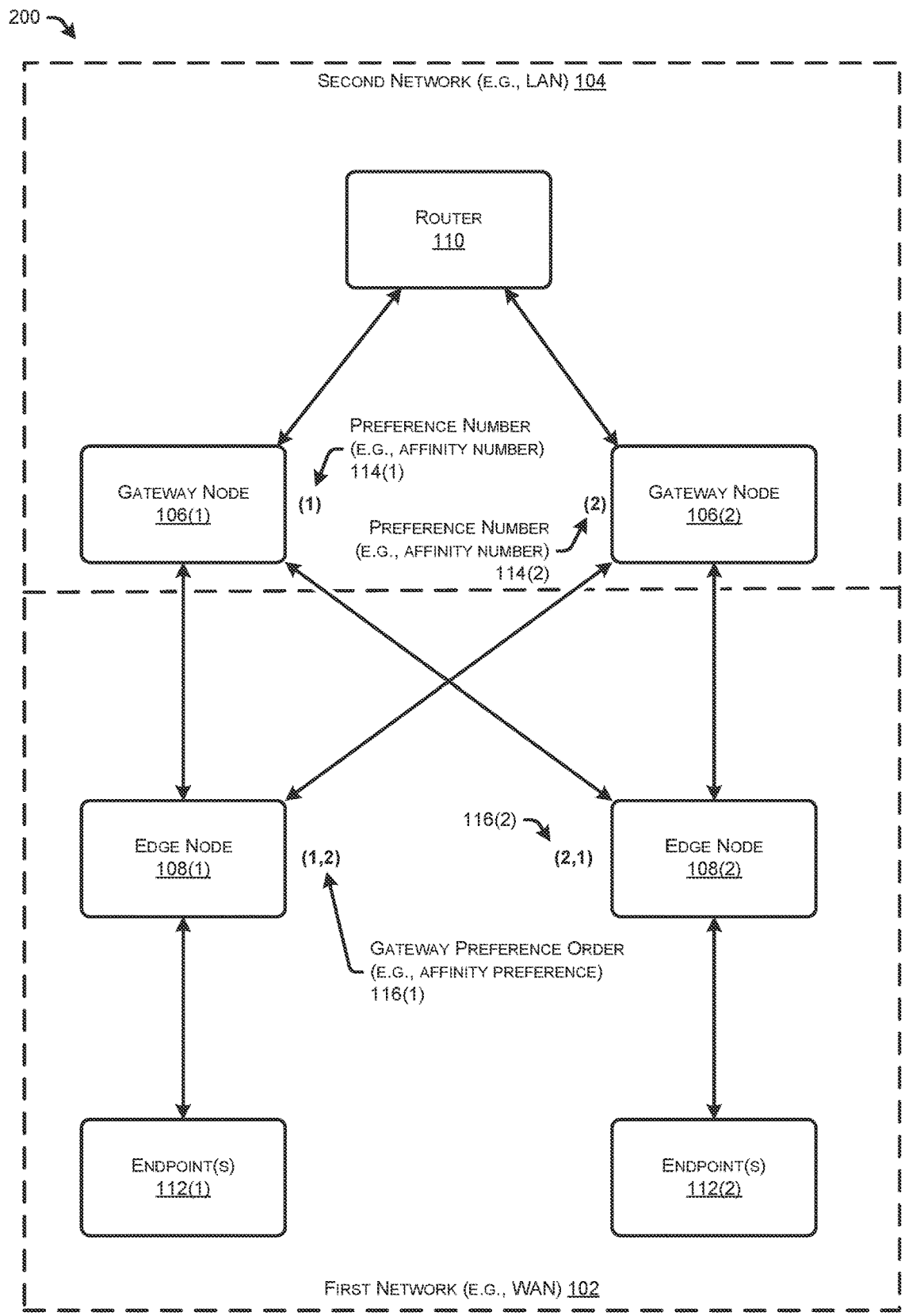
FIG. 2 is another illustration associated with performing the symmetric forwarding techniques disclosed herein in an example active/active gateway architecture.

FIG. 2 is another illustration associated with performing the symmetric forwarding techniques disclosed herein in an example active/active gateway architecture 200. Active/active gateway behavior can also be supported using the techniques disclosed herein by using per-branch gateway preference order. This can be used in scenarios where the site-to-site traffic flows via direct tunnels (as is often the case within an MRF region). In the example shown in FIG. 2, the first edge node 108(1) has the gateway preference order 116(1) of "(1, 2)," the second edge node 108(2) has the gateway preference order 116(2) of "(2, 1)," traffic between the first edge node 108(1) and the second edge node 108(2) can flow via a direct tunnel, the first edge node 108(1) will prefer to use the first gateway node 106(1) to access the data center, and the second edge node 108(2) will prefer to use the second gateway node 106(2) to access the data center. This way, both the first gateway node 106(1) and the second gateway node 106(2) are used in active/active fashion.

Additionally, in some examples, derived-affinity can be computed from affinity in the presence of per-branch gateway preference orders (e.g., affinity preference orders). However, when the gateway nodes 106 learn a route from an edge node that has a custom (e.g., not "auto") gateway preference order configured, the derived-affinity may be computed a little differently. For example, and with reference again to FIG. 2, the first gateway node 106(1) has preference number 114(1) "1," the second gateway node 106(2) has preference number 114(2) "2," the second edge node 108(2) has gateway preference order configured as "(2, 1)," so the second edge node 108(2) is configured to prefer the second gateway node 106(2) over the first gateway node 106(1). In such an example, if the endpoint(s) 112(2) are associated with a prefix "P2," when a route associated with P2 is received by the first gateway node 106(1), the first gateway node 106(1) will know that the source second edge node 108(2) has a gateway preference order 116(2) of "(2, 1)" and that its own preference number 114(1) is "1," so the first gateway node 106(1) can infer that it is the second-most preferred gateway (based on the 1-based-index of its own preference number 114(1) in the source second edge node's gateway preference order 116(2)). The 1-based-index is defined as the index (starting with 1) of the preference number matching the route's gateway preference order in the ordered list of preference numbers for the gateway. When the first gateway node 106(1) re-originates the route associated with the prefix P2, instead of setting its own preference number 114(1) as the derived-affinity, it sets the 1-based-index of its own preference number in the gateway preference order of the route originator (the second edge node 108(2) in this case). So, the derived-affinity in this case will be 2. When the second gateway node 106(2) does its re-origination for P2, it sets the derived-affinity as 1, since its preference number 114(2) is present in the very first spot in the route originator's gateway preference order 116(2). This way, the second gateway node 106(2) is the preferred gateway for return traffic associated with the prefix P2 as well, thereby achieving traffic symmetry.

Figure 3:
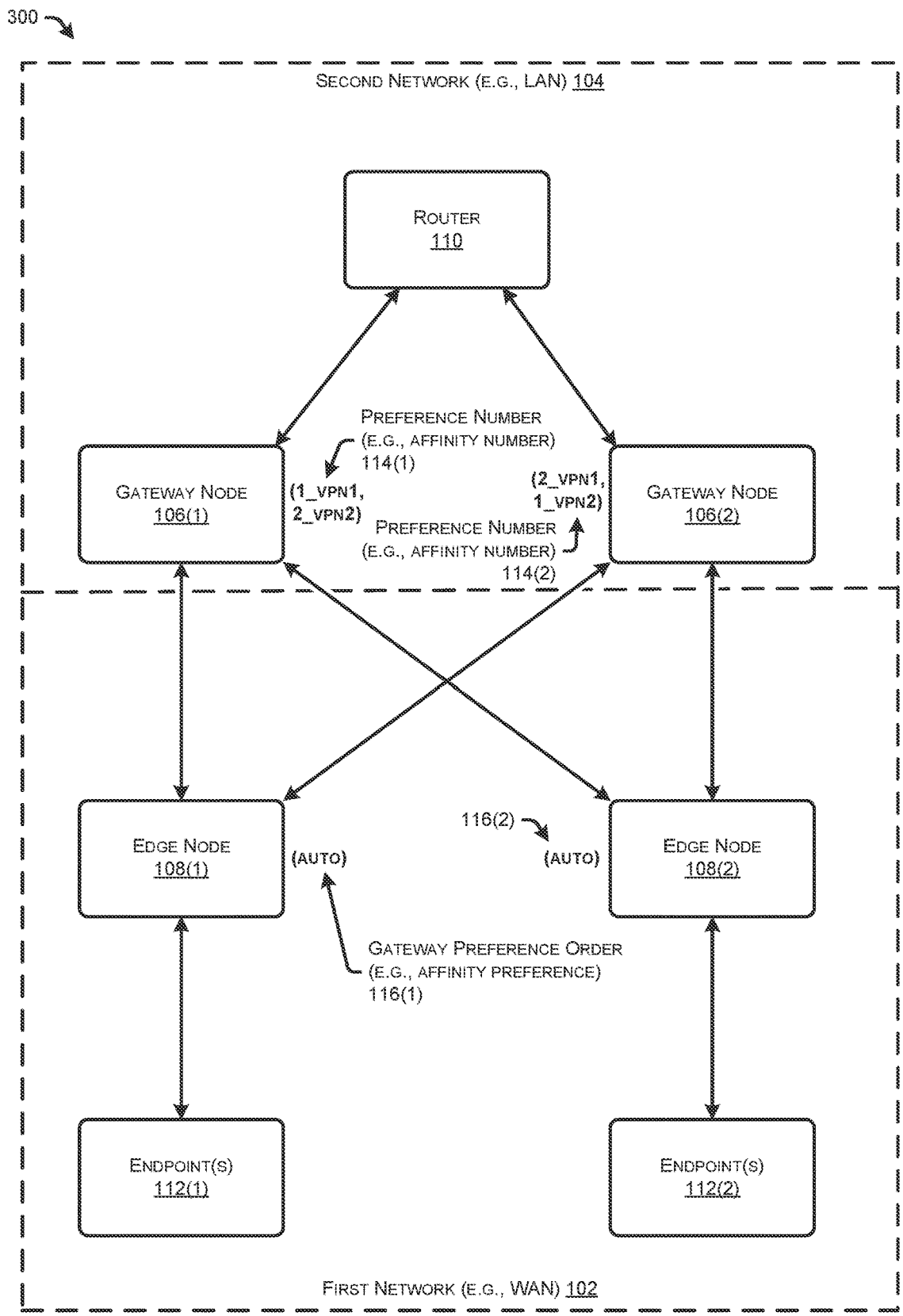
FIG. 3 is yet another illustration associated with performing the symmetric forwarding techniques disclosed herein in an example active/active gateway architecture that is achieved through virtual private network (VPN) carving.

FIG. 3 is yet another illustration associated with performing the symmetric forwarding techniques disclosed herein in an example active/active gateway architecture 300 that is achieved through virtual private network (VPN) carving. By using VPN carving, different gateways may act as primary for different VPNs (or even different application types that can be identified using prefix lists or prefix tagging). In the example illustration shown in FIG. 3, the first gateway node 106(1) has preference numbers 114(1) "1" for VPN1 and "2" for VPN2. In contrast, the second gateway node 106(2) has preference numbers 114(2) "2" for VPN1 and "1" for VPN2 (e.g., the reverse of what the first gateway node 106(1) has). In such an example, when the first edge node 108(1) and the second edge node 108(2) send traffic in VPN1, they prefer the first gateway node 106(1) and the second gateway node 106(2) is backup. For VPN2 traffic, on the other hand, the second gateway node 106(2) is primary and the first gateway node 106(1) is backup. This way, both gateway nodes 106 are acting as active at the same time.

In examples, the techniques disclosed herein may also be used for computing derived affinity in the presence of extranet VPN route leaking. For instance, there may be some scenarios where different hubs are preferred for traffic in different VPNs. This can introduce additional nuances when used with extranet route leaking. To ensure traffic symmetry in such cases, when route leaking is done on an SDN controller (e.g., vSmart), the following may be done: (i) leaking may be enabled for routes learnt from branch sites, not for re-originated routes from hubs/gateways; (ii) when a gateway learns the leaked route, it has information about both the current VPN (of the route) as well as the origin/source VPN of the route; (iii) the gateway may pick the lower of the two VPN numbers and pick the locally configured route preference number (e.g., affinity number) for that VPN, and that may become the preference number of the leaked route; (iv) this ensures that even if different gateways are primary gateways for different VPNs, traffic flow is still symmetric, since each gateway may pick the preference number for the route consistently.

Figure 4:
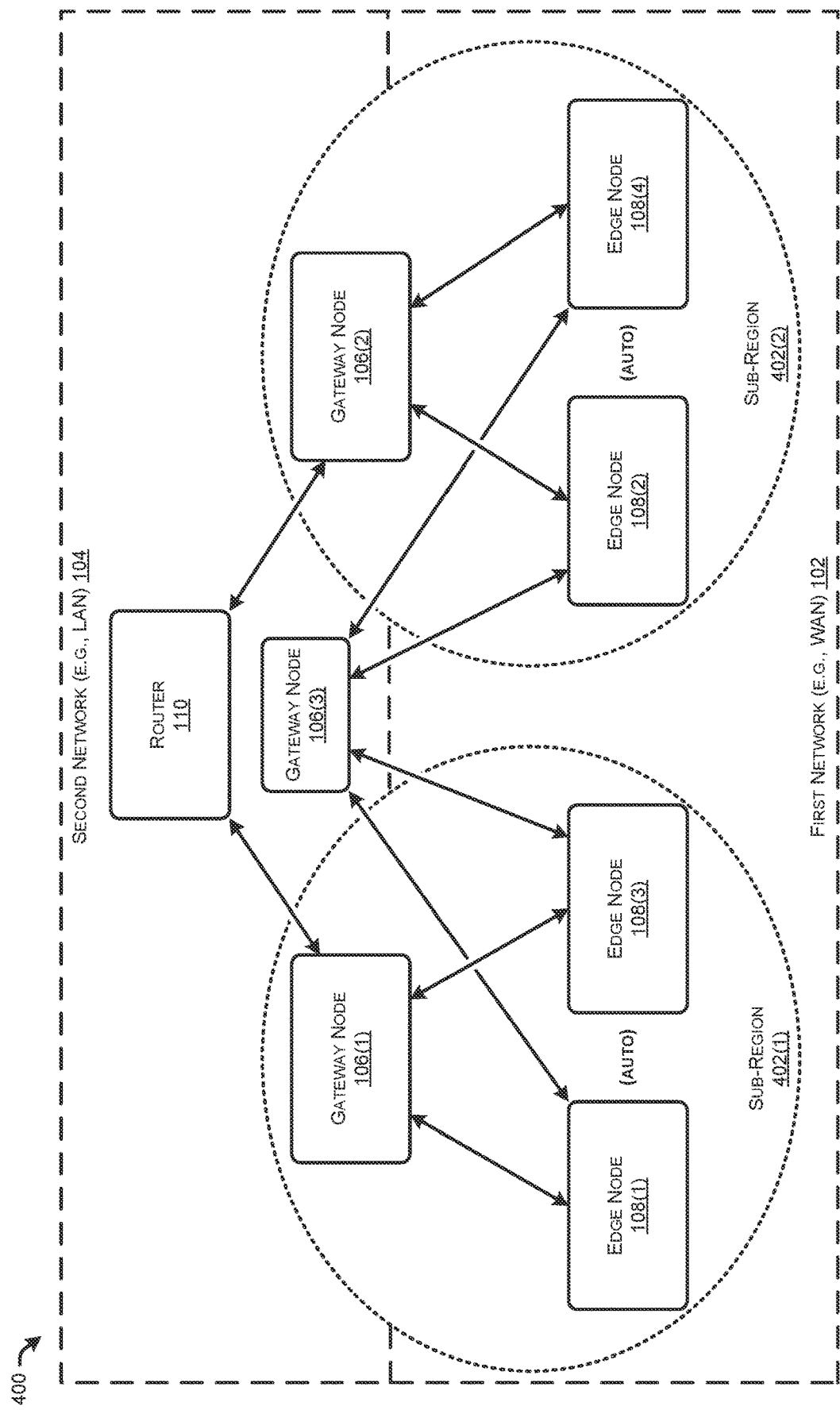
FIG. 4 is an illustration associated with performing the techniques disclosed herein in an example sub-region gateway architecture.

FIG. 4 is an illustration associated with performing the techniques disclosed herein in an example sub-region gateway architecture 400.

Achieving active/active gateway behavior and horizontal scaling with sub-regions:

In the example architectures 100-300 described above, horizontal scaling of gateways may sometimes be difficult since there is only a single gateway hop in between for traffic between the edge nodes 108. To achieve better horizontal scalability, branch-to-branch traffic (e.g., edge node to edge node traffic) may be configured to pass through two gateway nodes 106 by dividing into sub-regions 402 and assigning a different gateway node for each sub-region 402. For instance, the architecture 400 includes a first sub-region 402(1) and a second sub-region 402(2).

In this architecture 400, traffic between sub-regions 402 will pass through the gateway nodes 106 for both sub-regions 402. For instance, in the architecture 400, traffic from the first edge node 108(1) to the second edge node 108(2) may flow from the first edge node 108(1) to the first gateway node 106(1), from the first gateway node 106(1) to the router 110, from the router 110 to the second gateway node 106(2), and from the second gateway node 106(2) to the second edge node 108(2). Return traffic may take the same path. Similarly, traffic from the fourth edge node 108(4) to the third edge node 108(3) may flow from the fourth edge node 108(4) to the second gateway node 106(2), from the second gateway node 106(2) to the router 110, from the router 110 to the first gateway node 106(1), and from the first gateway node 106(1) to the third edge node 108(3). Return traffic may take the same path.

In examples, within a sub-region 402 there can be multiple gateway nodes 106 deployed for redundancy. Further, all the mechanisms described in previous scenarios above and herein (e.g., per-branch-affinity, VPN carving, etc.) may be used to achieve active/active gateways within a sub-region 402. These techniques provide a great deal of horizontal scalability by allowing multiple gateway nodes 106 to be in active mode at the same time without any need for per branch affinity preference order and/or VPN carving.

Figure 5:
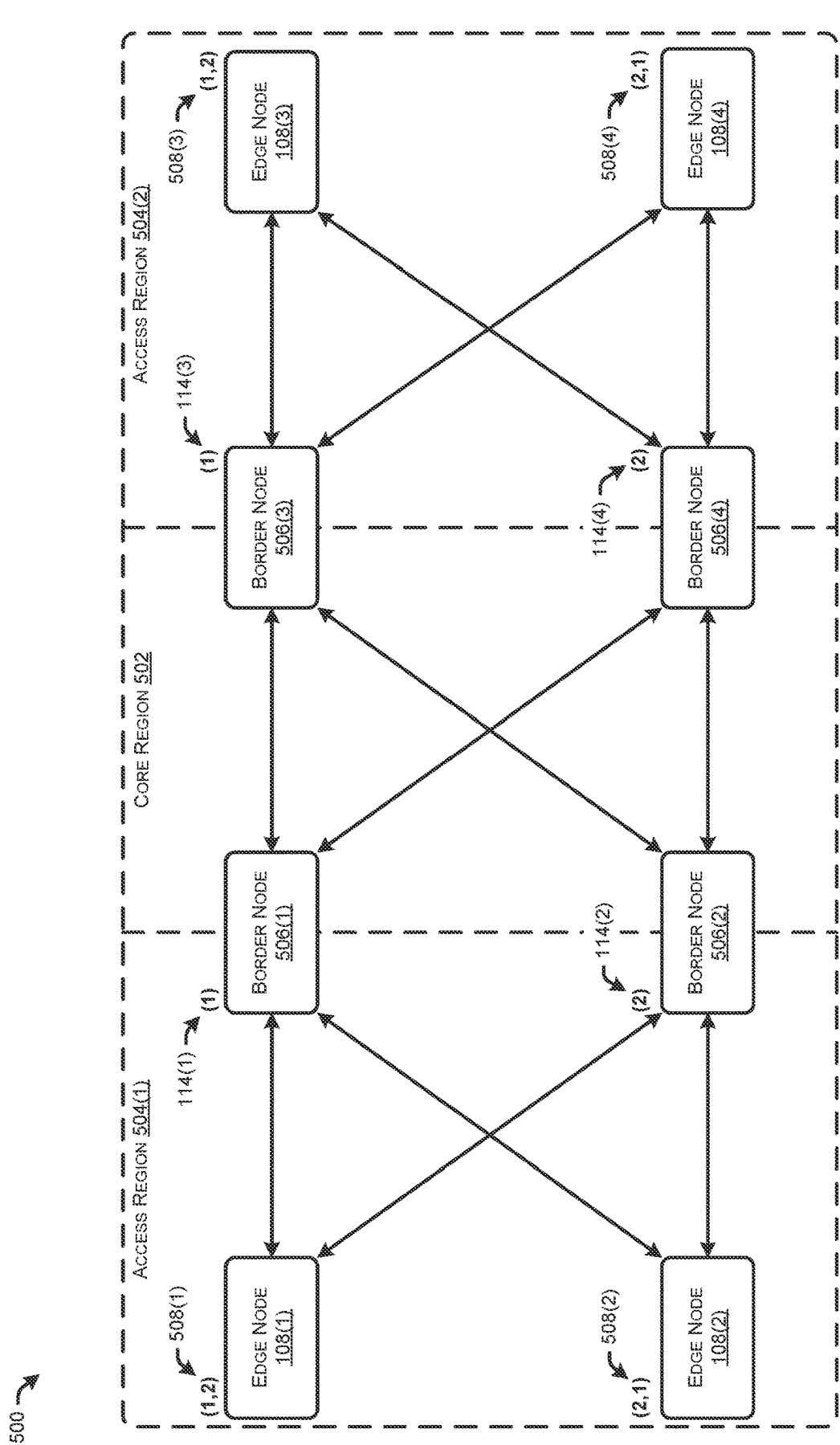
FIG. 5 is another illustration associated with performing the techniques disclosed herein in an example Multi-Region Fabric architecture.

FIG. 5 is another illustration associated with performing the techniques disclosed herein in an example Multi-Region Fabric (MRF) architecture 500. In examples, achieving symmetry in MRF network architectures may be similar to the different scenarios described above in FIGS. 1-4 and herein. In the case of MRF networks, however, the gateway nodes may be replaced with border nodes 506 (e.g., border routers). In some examples, derived-affinity may be used when routes are re-originated from the access-regions 504(1) and 504(2) to the core-region 502. Additionally, or alternatively, derived protocol-independent cost may be used when routes are redistributed into data centers, which, in some examples, could be behind the border routers 506. In some examples, all of the active/active solutions described above and herein (e.g., per branch affinity preference, VPN carving, sub-regions, etc.) may be used to achieve active/active load balancing on the border nodes 506.

For example, the first border node 506(1) has preference number 114(1) "1", the second border node 506(2) has preference number 114(2) "2," and the second edge node 108(2) has the border preference order 508(2) configured as "(2, 1)." As such, the second edge node 108(2) is configured to prefer the second border node 506(2) over the first border node 506(1). In such an example, if the second edge node 108(2) provides connectivity to a group of devices having a prefix "P2," when a route associated with P2 is received by the first border node 506(1), the first border node 506(1) will know that the second edge node 108(2) has a border preference order 508(2) of "(2, 1)" and that its own preference number 114(1) is "1," so the first border node 506(1) can infer that it is the second-most preferred border (based on the 1-based-index of its own preference number 114(1) in the source second edge node's border preference order 508(2)). When the first border node 506(1) re-originates the route associated with the prefix P2, instead of setting its own preference number 114(1) as the derived-affinity, it sets the 1-based-index of its own preference number in the border preference order of the route originator (the second edge node 108(2) in this case). So, the derived-affinity for the route associated with P2 in this case will be "2". When the second border node 506(2) does its re-origination for P2, it sets the derived-affinity as "1", since its preference number 114(2) is present in the very first spot in the route originator's border preference order 508(2). This way, the second border node 506(2) is the preferred border for return traffic associated with the prefix P2 as well, thereby achieving traffic symmetry.

Similarly, the border nodes 506(3) and 506(4) may perform the same or similar techniques and utilize the border preference orders 508(3) and 508(4) to re-originate routes associated with prefixes behind the edge nodes 108(3) and 108(4). This enables symmetry for forward and return traffic sent from endpoints behind the edge nodes 108 in each of the access regions 504.

In examples, the border nodes 506 may utilize aspects of the techniques described herein to determine or compute derived-affinity from affinity. For example, when routes are re-originated by the border nodes 506, the concept of derived-affinity may be used to ensure that the return traffic will flow via the same gateway as the forward traffic. For example, a control plane or overlay management protocol (OMP) on the first border node 506(1) and second border node 506(2) may learn routes from the different branches associated with the edge nodes 108. When the first border node 506(1) receives a route associated with a prefix P1 (from the first edge node 108(1)), it can see that the first edge node 108(1) has the border preference order 508(1) (e.g., affinity-preference-order) of "(1,2)," so it may set its own preference number 114(1) (e.g., affinity-number configuration) (1 in this case) as the derived-affinity in the re-originated route. Similarly, the second border node 506(2) may set its own preference number 114(2) (e.g., affinity-number configuration) (2 in this case) as the derived-affinity. This ensures that the first border node 506(1) will be used for all traffic to endpoint(s) behind the first edge node 108(1) and the second border node 506(2) will be used as standby. Additionally, since the first border node 506(1) re-originates the route with a better derived-affinity value (compared to the one from the second border node 506(2)), the first border node 506(1) attracts all the return traffic associated with the route to P1 towards itself.

Figure 6:
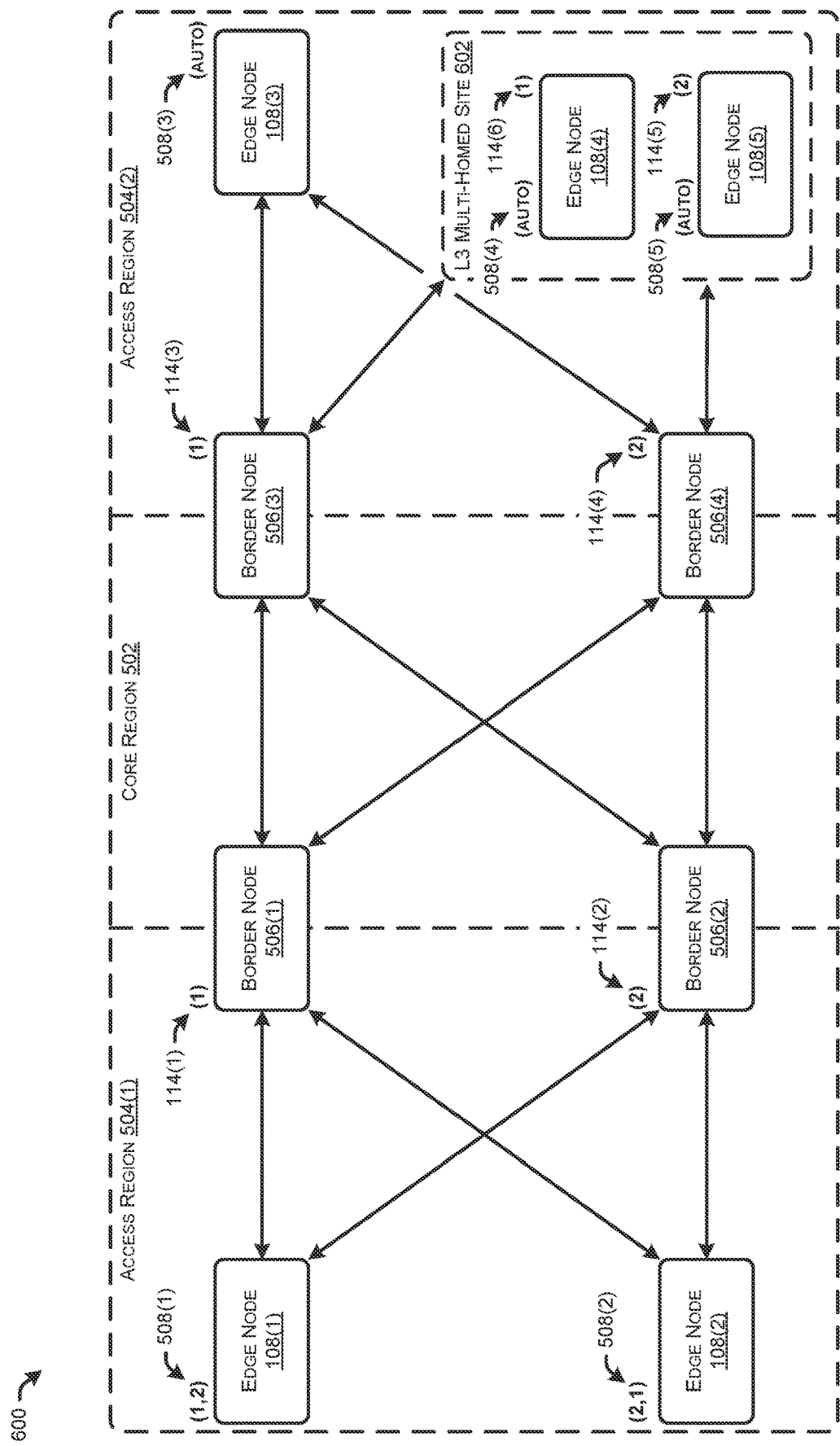
FIG. 6 is an illustration associated with performing the techniques disclosed herein in an example Multi-Region Fabric architecture having a layer 3 dual-homed site.

FIG. 6 is an illustration associated with performing the techniques disclosed herein in an example Multi-Region Fabric architecture 600 having a layer 3 (L3) multi-homed site 602. The techniques disclosed herein can naturally be applied to achieve symmetry in such architectures due to the bi-directional nature of affinity techniques. For instance, both preference numbers 114(5) and 114(6) and border preference orders 508(4) and 508(6) can be configured on the edge nodes 108(4) and 108(5) in the access region 504(2) in addition to being configured on the border nodes. This sets up bi-directional border preferencing (e.g., affinity) and symmetry for traffic. Additionally, per branch border preference order and/or VPN carving on the border nodes 506 can be used for active/active border node behavior.

Figure 7:
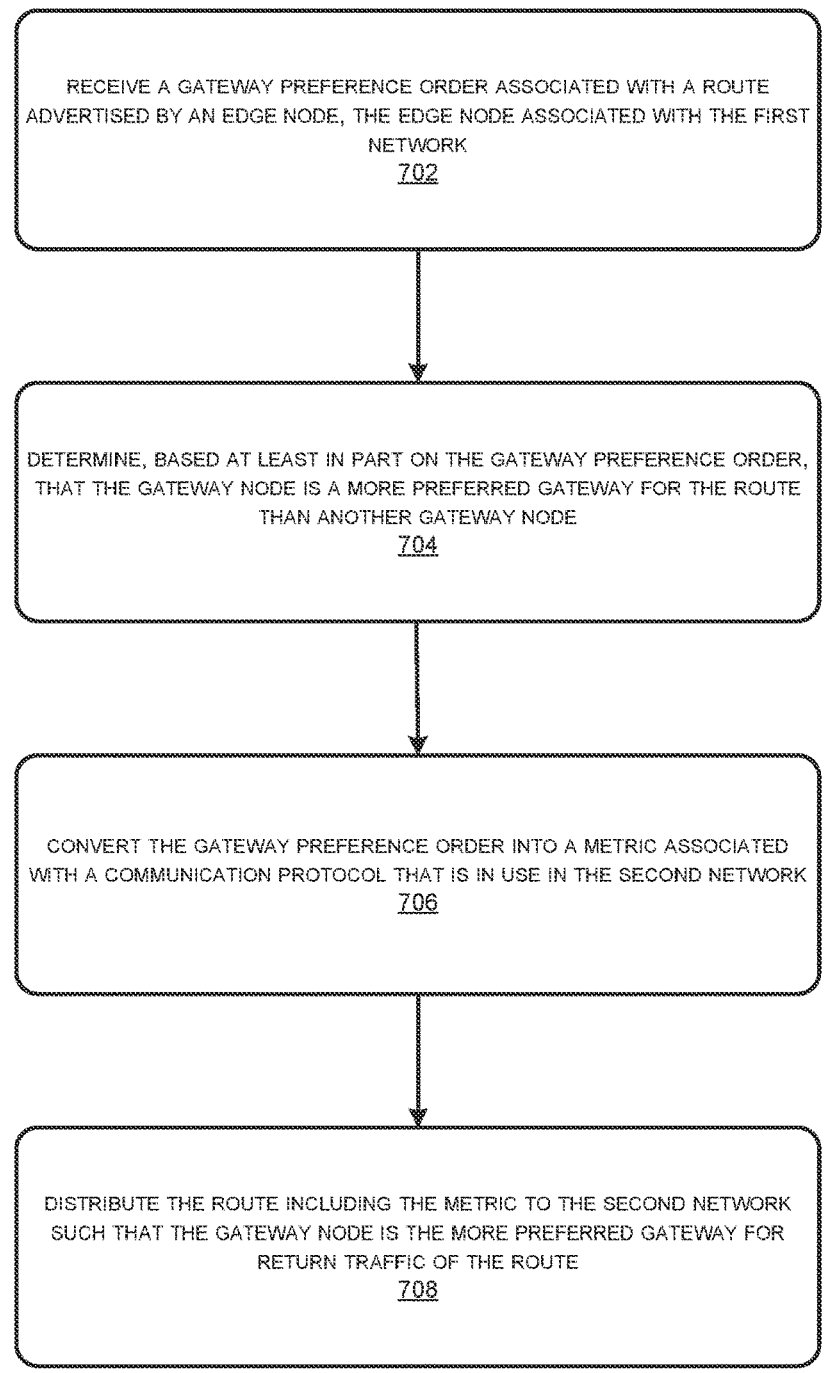
FIG. 7 is a flow diagram illustrating an example method associated with the techniques described herein for ensuring symmetric forwarding between disparate networks, without requiring data plane changes.

FIG. 7 is a flow diagram illustrating an example method 700 associated with the techniques described herein for ensuring symmetric forwarding between disparate networks, without requiring data plane changes. The logical operations described herein with respect to FIG. 7 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 700 begins at operation 702, which includes receiving a gateway preference order associated with a route advertised by an edge node, the edge node associated with the first network. For instance, the first gateway node 106(1) may receive the first gateway preference order 116(1) associated with a first route advertised by the first edge node 108(1). Additionally, or alternatively, the first gateway node 106(1) may receive the second gateway preference order 116(2) associated with a second route advertised by the second edge node 108(2).

At operation 704, the method 700 includes determining, based at least in part on the gateway preference order, that the gateway node is a more preferred gateway for the route than another gateway node. For instance, the first gateway node 106(1) may determine, based at least in part on the first gateway preference order 116(1), that the first gateway node 106(1) is the more preferred gateway for the first route than the second gateway node 106(2). Additionally, or alternatively, the first gateway node 106(1) may determine, based at least in part on the second gateway preference order 116(2), that the second gateway node 106(2) is the more preferred gateway for the second route than the first gateway node 106(1).

At operation 706, the method 700 includes converting the gateway preference order into a metric associated with a communication protocol (e.g., IP routing protocol) that is in use in the second network. For instance, the first gateway node 106(1) may convert the first gateway preference order 116(1) into a first metric associated with the communication protocol that is in use in the second network 104. Additionally, or alternatively, the first gateway node 106(1) may convert the second gateway preference order 116(2) into a second metric associated with the communication protocol that is in use in the second network 104.

At operation 708, the method 700 includes distributing the route including the metric to the second network such that the gateway node is the more preferred gateway for return traffic of the route. For instance, the first gateway node 106(1) may distribute the first route including the first metric to the second network 104 such that the first gateway node 106(1) is the more preferred gateway for return traffic of the first route. Additionally, or alternatively, the first gateway node 106(1) may distribute the second route including the second metric to the second network 104 such that the second gateway node 106(1) is the more preferred gateway for return traffic of the second route.

Figure 8:
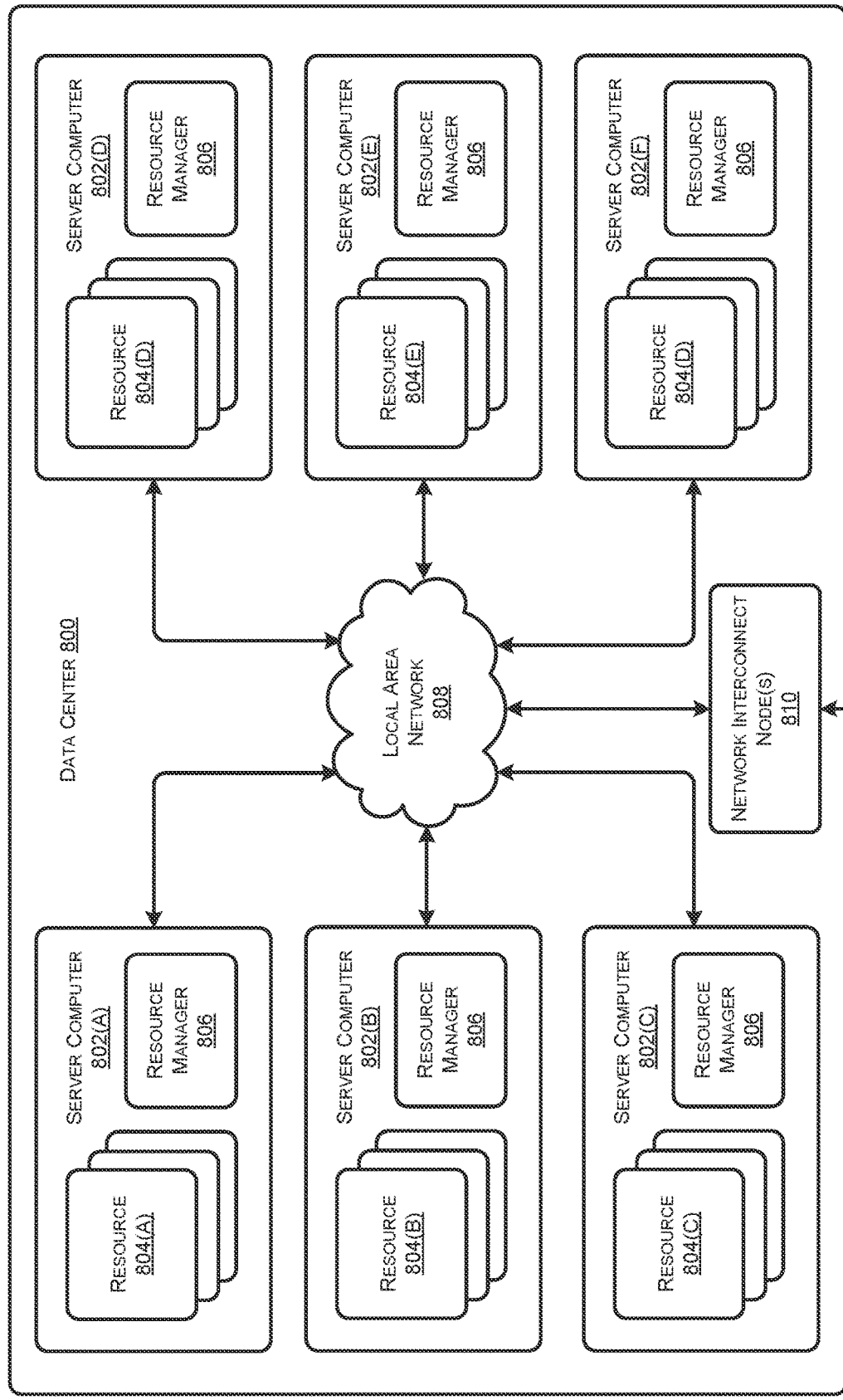
FIG. 8 is a computing system diagram illustrating an example configuration of a computing environment in which aspects of the technologies disclosed herein may be performed.

FIG. 8 is a computing system diagram illustrating an example configuration of the data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802") for providing computing resources. In some examples, the resources and/or server computers 802 may include, or correspond to, the any type of networked device described herein. Although described as servers, the server computers 802 may comprise any type of networked device, such as servers, switches, routers, hubs, bridges, gateways, modems, repeaters, access points, etc.

The server computers 802 can be standard tower, rack-mount, or blade server computers configured appropriately for providing computing resources. In some examples, the server computers 802 may provide computing resources 804 including data processing resources such as VM instances or hardware computing systems, database clusters, computing clusters, storage clusters, data storage resources, database resources, networking resources, VPNs, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate LAN 808 (local area network) is also utilized to interconnect the server computers 802A-802F. In some examples, the LAN 808 may correspond with the second network 104 described above. Additionally, in some instances, the data center 800 could correspond with the core region 502. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers, between each of the server computers 802A-802F in each data center 800, and, potentially, between computing resources in each of the server computers 802. It should be appreciated that the configuration of the data center 800 described with reference to FIG. 8 is merely illustrative and that other implementations can be utilized.

In examples, the data center 800 may also include one or more network interconnect node(s) 810. The network interconnect node(s) 810 may correspond with any of the gateway nodes 106 and/or border nodes 506 described above, as well as with other types of network interconnecting devices.

In some instances, the data center 800 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like tenant containers and VM instances, data storage resources, networking resources, data communication resources, network services, VPN instances, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations. One illustrative embodiment for a data center 800 that can be utilized to implement the technologies disclosed herein will be described below with regard to FIG. 9.

Figure 9:
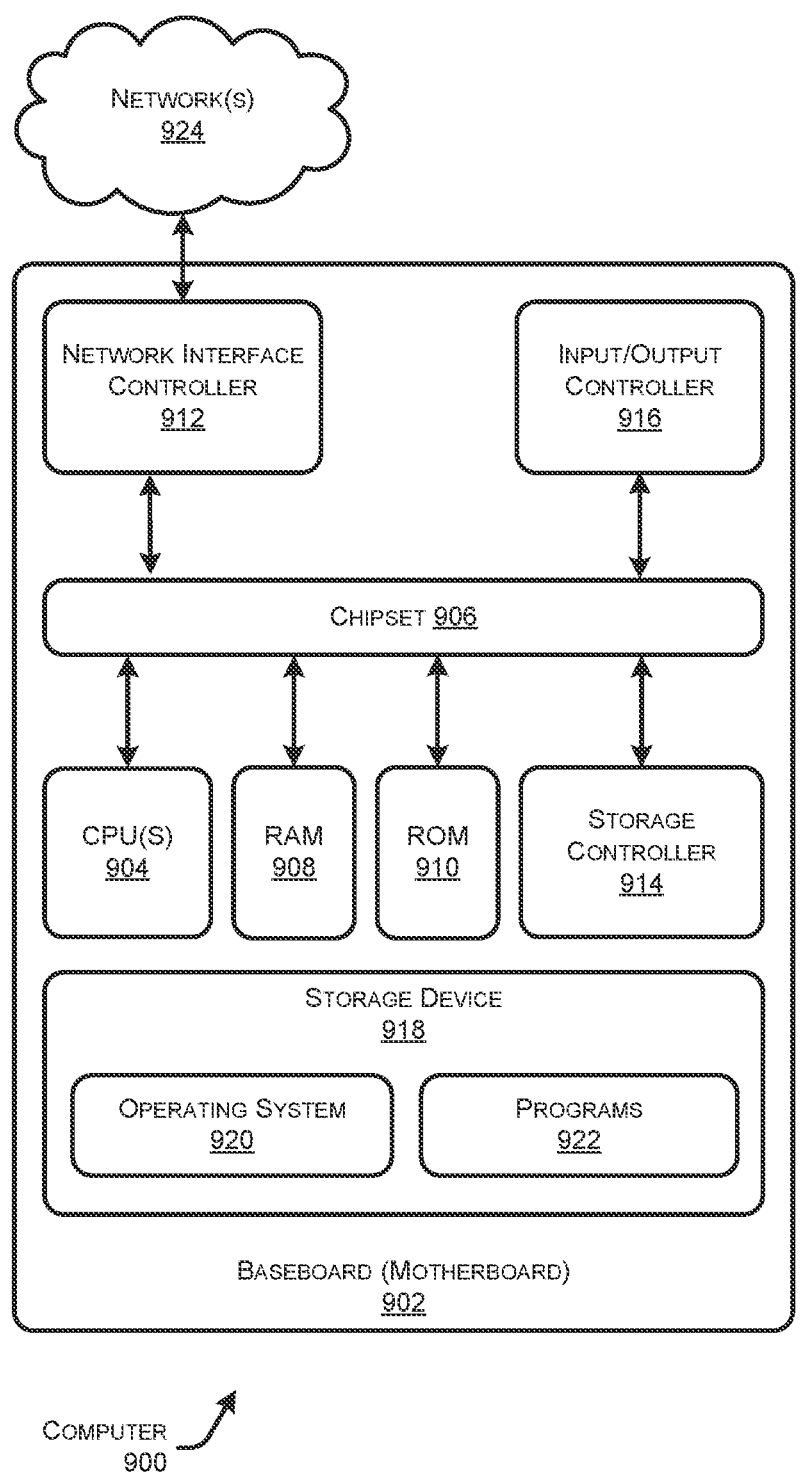
FIG. 9 is a computer architecture diagram showing an illustrative computer hardware architecture for implementing a computing device that can be utilized to implement aspects of the various technologies presented herein.

FIG. 9 is a computer architecture diagram showing an illustrative computer hardware architecture for implementing a computing device that can be utilized to implement aspects of the various technologies presented herein. The computer architecture shown in FIG. 9 illustrates a conventional server computer, gateway device, border device, network node (e.g., edge node), router, workstation, desktop computer, laptop, tablet, network appliance, e-reader, smartphone, load balancer, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network. The chipset 906 can include functionality for providing network connectivity through a NIC 912, such as a gigabit Ethernet adapter. The NIC 912 is capable of connecting the computer 900 to other computing devices over the network 924. It should be appreciated that multiple NICs 912 can be present in the computer 900, connecting the computer to other types of networks and remote computer systems. In some examples, the NIC 912 may be configured to perform at least some of the techniques described herein.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the architectures 100-600 and or any components included therein, may be supported by one or more devices similar to computer 900. Stated otherwise, some or all of the operations performed by the architectures 100-600, and or any components included therein, may be performed by one or more computer devices 900 operating in a scalable arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes and functionality described above with regard to FIGS. 1-8, and herein. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

The computer 900 may include one or more hardware processors (processors) configured to execute one or more stored instructions. The processor(s) may comprise one or more cores. Further, the computer 900 may include one or more network interfaces configured to provide communications between the computer 900 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 922 may comprise any type of programs or processes to perform the techniques described in this disclosure for utilizing control plane constructs to ensure symmetric forwarding between disparate networks, without requiring data plane changes.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    receiving, at a gateway node that facilitates communications between a first network and a second network, a gateway preference order associated with a route advertised by an edge node, the edge node associated with the first network;
    determining, by the gateway node and based at least in part on the gateway preference order, that the gateway node is a more preferred gateway for the route than another gateway node;
    converting, by the gateway node, the gateway preference order into a metric associated with an internet protocol (IP) routing protocol that is in use in the second network; and
    distributing, by the gateway node, the route including the metric to the second network such that the gateway node is the more preferred gateway for return traffic of the route.

2. The method of claim 1, further comprising storing, by the gateway node, an indication that the gateway node is the more preferred gateway for the route, the indication stored by the gateway node as a protocol-independent cost metric in a routing information base (RIB).

3. The method of claim 1, wherein the IP routing protocol that is in use in the second network comprises at least one of External Border Gateway Protocol (EBGP), Internal Border Gateway Protocol (IBGP), or Open Shortest Path First (OSPF).

4. The method of claim 1, further comprising determining, by the gateway node, a preference number associated with the gateway node, wherein determining that the gateway node is the more preferred gateway is further based at least in part on the preference number associated with the gateway node.

5. The method of claim 4, wherein determining that the gateway node is the more preferred gateway comprises determining, by the gateway node, that the preference number associated with the gateway node ranks higher in the gateway preference order than another preference number associated with the other gateway node.

6. The method of claim 1, wherein the first network is a wide area network (WAN) and the second network is a local area network (LAN).

7. The method of claim 1, wherein the first network is associated with an access region and the second network is associated with a core region.

8. The method of claim 1, wherein:
    the gateway node is a border router,
    the other gateway node is another border router,
    the first network is associated with a first region of a software-defined wide area network (SD-WAN), and the second network is associated with a second region of the SD-WAN.

9. The method of claim 1, wherein the gateway node is associated with a first sub-region and the other gateway node is associated with a second sub-region.

10. A system associated with a gateway node that facilitates communications between a first network and a second network, the system comprising:
one or more processors; and
one or more non-transitory computer-readable media storing instructions that, when executed by the one or more processors, cause gateway node to perform operations comprising:
receiving a gateway preference order associated with a route advertised by an edge node, the edge node associated with the first network;
determining, based at least in part on the gateway preference order, that the gateway node is a more preferred gateway for the route than another gateway node;
converting the gateway preference order into a metric associated with an IP routing protocol that is in use in the second network; and
distributing the route including the metric to the second network such that the gateway node is the more preferred gateway for return traffic of the route.

11. The system of claim 10, the operations further comprising storing an indication that the gateway node is the more preferred gateway for the route, the indication stored by the gateway node as a protocol-independent cost metric in a routing information base (RIB).

12. The system of claim 10, wherein the IP routing protocol that is in use in the second network comprises at least one of External Border Gateway Protocol (EBGP), Internal Border Gateway Protocol (IBGP), or Open Shortest Path First (OSPF).

13. The system of claim 10, the operations further comprising determining a preference number associated with the gateway node, wherein determining that the gateway node is the more preferred gateway is further based at least in part on the preference number associated with the gateway node.

14. The system of claim 13, wherein determining that the gateway node is the more preferred gateway comprises determining that the preference number associated with the gateway node ranks higher in the gateway preference order than another preference number associated with the other gateway node.

15. The system of claim 10, wherein:
the gateway node is a border router,
the other gateway node is another border router,
the first network is associated with a first region of a software-defined wide area network (SD-WAN), and
the second network is associated with a second region of the SD-WAN.

16. The system of claim 10, wherein the gateway node is associated with a first sub-region and the other gateway node is associated with a second sub-region.

17. One or more non-transitory computer-readable media storing instructions that, when executed, cause one or more processors to perform operations comprising:
receiving a gateway preference order associated with a route advertised by an edge node, the edge node associated with a first network;
determining, based at least in part on the gateway preference order, that a gateway node is a more preferred gateway for the route than another gateway node, the gateway node configured to facilitate communications between the first network and a second network;
converting the gateway preference order into a metric associated with an IP routing protocol that is in use in the second network; and
distributing the route including the metric to a communication node associated with the second network such that the gateway node is the more preferred gateway for return traffic of the route.

18. The one or more non-transitory computer-readable media of claim 17, the operations further comprising storing an indication that the gateway node is the more preferred gateway for the route, the indication stored as a protocol-independent cost metric in a routing information base (RIB).

19. The one or more non-transitory computer-readable media of claim 17, the operations further comprising determining a preference number associated with the gateway node, wherein determining that the gateway node is the more preferred gateway is further based at least in part on the preference number associated with the gateway node.

20. The one or more non-transitory computer-readable media of claim 19, wherein determining that the gateway node is the more preferred gateway comprises determining that the preference number associated with the gateway node ranks higher in the gateway preference order than another preference number associated with the other gateway node.

* * * * *